United States Patent [19]
Monterosso et al.

[11] Patent Number: 4,881,071
[45] Date of Patent: * Nov. 14, 1989

[54] TRANSDUCER FOR MEASURING ONE OR MORE PHYSICAL QUANTITIES OR ELECTRIC VARIABLES

[75] Inventors: Gianpaolo Monterosso, Milan; Riccardo Marazzi, Vaprio D'Adda; Mario Nicotra, Segrate; Luciano Manenti, Gussago, all of Italy

[73] Assignee: Nicotra Sistemi S.p.A., Pero, Italy

[ * ] Notice: The portion of the term of this patent subsequent to Oct. 3, 2006 has been disclaimed.

[21] Appl. No.: 120,839

[22] Filed: Nov. 16, 1987

Related U.S. Application Data

[63] Continuation-in-part of Ser. No. 70,808, Jul. 7, 1987, abandoned.

Foreign Application Priority Data

Jul. 24, 1986 [IT] Italy................................ 21245 A/86

[51] Int. Cl.$^4$ ............................................. H04Q 11/00
[52] U.S. Cl. ............................ 340/870.13; 340/870.01
[58] Field of Search ...................... 340/870.13, 870.01, 340/870.16, 870.26, 870.17, 540, 605, 606, 635, 557; 73/40.5 R, 40.5 A, 49.1, 756; 370/86, 92; 307/515, 519

[56] References Cited

U.S. PATENT DOCUMENTS

| | | | |
|---|---|---|---|
| 4,111,058 | 9/1978 | Gross .................................... | 73/721 |
| 4,262,287 | 4/1981 | Mccoughlin et al. .......... | 340/870.13 |
| 4,442,716 | 4/1984 | Coe et al. ............................. | 73/721 |
| 4,549,180 | 10/1985 | Masuda .......................... | 340/870.13 |
| 4,704,609 | 11/1987 | Rittenberry et al. .......... | 340/870.13 |

Primary Examiner—Donald J. Yusko
Assistant Examiner—Tyrone Queen
Attorney, Agent, or Firm—Wenderoth, Lind & Ponack

[57] ABSTRACT

A single/multiple transducer for measuring physical quantities and variables includes a multiplexer unit for selecting the sensors of physical quantities and electric variables by the decoding of an address, thereby permitting a single power supply, a single counter and a single clock generator to be used in order to enable a plurality of sensors placed in a plurality of locations and to transmit the measurements thereof, each of said sensors detecting its own physical quantity or electric variable.

8 Claims, 4 Drawing Sheets

TRANSDUCER FOR MEASURING ONE OR MORE PHYSICAL QUANTITIES OR ELECTRIC VARIABLES

CROSS-REFERENCES TO RELATED APPLICATIONS

This application is a continuation-in-part of our prior application Ser. No. 070,808 filed on July 7, 1987, now abandoned.

BACKGROUND OF THE INVENTION

1. Field of the Invention

The present invention relates generally to transducers and more particularly to a transducer capable of detecting one or more physical quantities (for example pressure, temperature, moisture, etc.) or conventional electric variables (for example voltage, current, resistance, etc.).

2. Description of the Prior Art

When using data acquisition systems, a problem which is normally encountered is the physical connection between the transducer and the apparatus used for the acquisition of the measurement provided by a sensor.

Often one is obliged to provide complex electric systems having multiple wire cables for connecting the sensors located along the network or, alternatively, to install decentralized or satellite data acquisition units which are connected by a single data line to the proper data acquisition unit.

This technique has been revealed to be quite expensive because a plurality of devices are required to meet the above mentioned purpose, these devices requiring in turn relatively high servicing as well as installation costs.

SUMMARY OF THE INVENTION

The present invention aims at reducing in a substantial manner the costs associated with obtaining the measurements of the physical quantities and electric variables as well as the operating costs of the transducers involved in such measurements.

More particularly, the single/multiple transducer according to the present invention is characterized in that it comprises:
- one or more sensors for detecting different physical quantities and electric variables,
- a multiplexer unit for enabling and selecting one of the sensors of a physical quantity and electric variable corresponding to a coded address assigned thereto,
- a clock generator,
- a counting and timing circuit for forming the address to be delivered to the multiplexer unit in order to select one of the externally connected sensors,
- a power supply for delivering the operating voltage to the above mentioned components, and
- a line for supplying and delivering a signal proportional to the physical quantity or variable detected by the sensors.

With this system a single pair of wires for transmitting measurements relating to different physical quantities and/or electric variables can be used. By using the present invention, it is not required that the transducers be equal in number to the number of the physical quantities and/or electric variables and that the timers be equal in number to the number of transducers, thereby providing important savings both as to the component costs and as to the operation thereof.

DESCRIPTION OF THE PREFERRED EMBODIMENT

Figure 1:
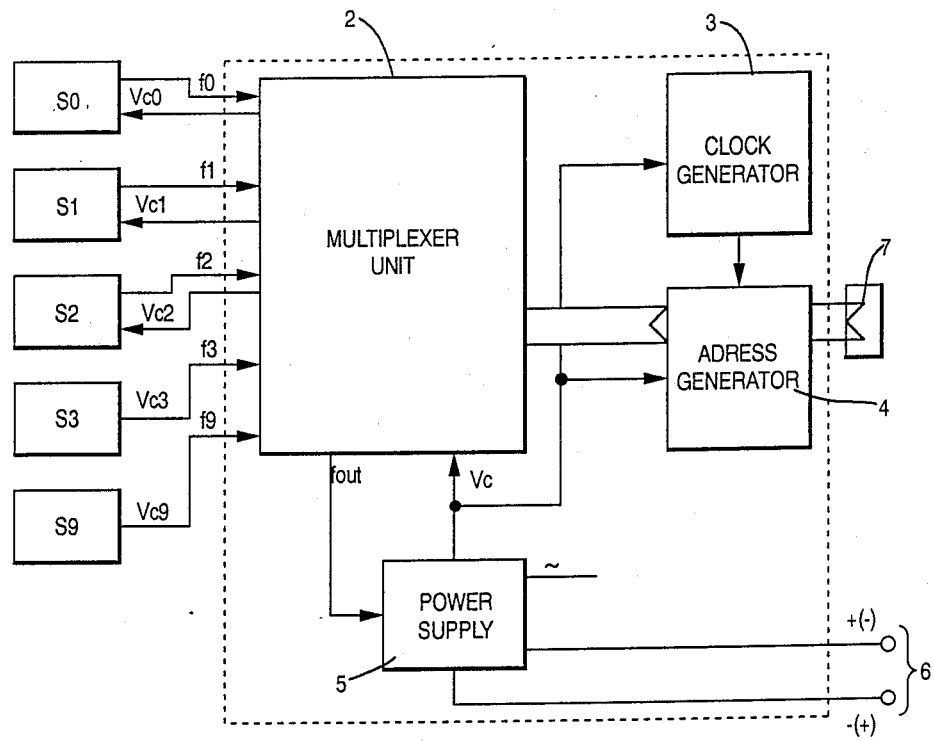
FIG. 1 is a block diagram of a single/multiple transducer in accordance with the present invention.

Referring now to FIG. 1, the transducer comprises a plurality of sensors S0,S1,S2,S3 ... S9 connected to a multiplexer unit 2 which is energized by a stablized power supply 5, a clock generator 3 and an address generator 4. The address generator 4 is connected to the multiplexer unit 2 and to a device 7 for programming the address code by the operator or installer.

SENSORS

Each sensor is designed so as to generate at its output a signal having a frequency which is proportional to the physical quantities or electric variables in accordance with a well know technique, as for example:
- the integrated circuit of NATIONAL SEMICONDUCTOR LM 555 and its equivlents applied as voltage-to-frequency converter (VCO) which permits the conversion of the voltage to frequency;
- the VCO circuit disclosed in "Application Note 81" AN81-3 issued in June 1973 described in "LINEAR APPLICATION HANDBOOK" of the National Semiconductor.

The voltage-to-frequency converter circuit provides as an output a frequency signal which is proportional to the voltage applied to its input.

Should a suitable resistor change its resistance, a voltage change thereacross will occur.

This voltage, when applied to the VCO circuit, results in a signal having a frequency of which is proportional to the electric resistance change.

CLOCK GENERATOR 3

Figure 2:
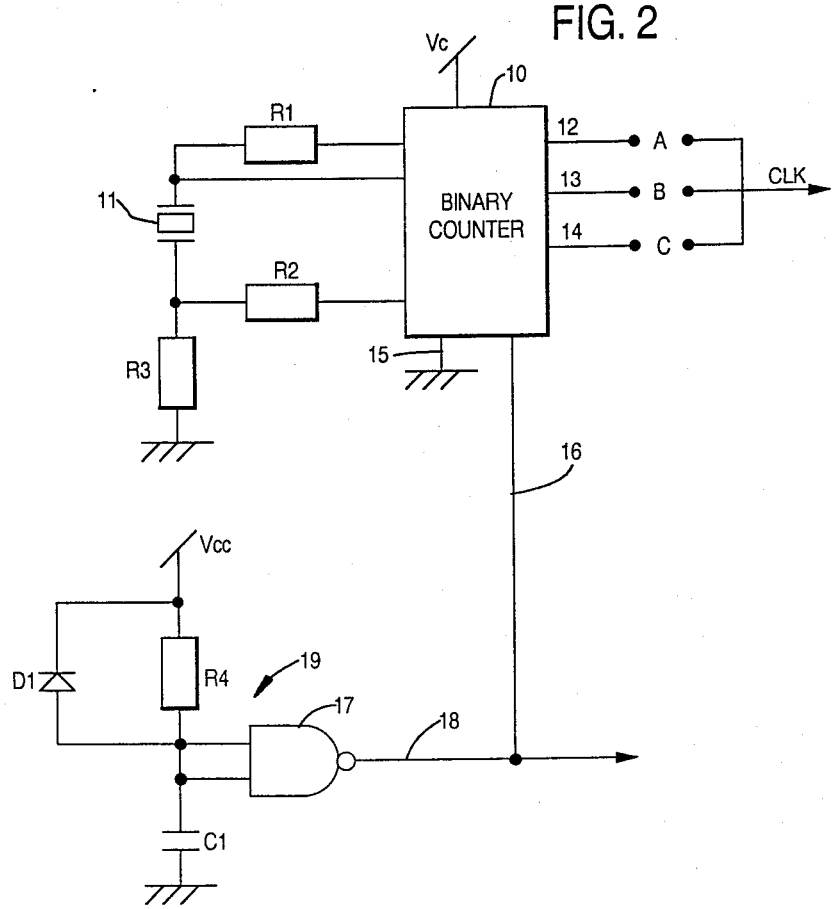
FIG. 2 shows the circuit diagram of the clock generator.

As can be seen in FIG. 2, the clock generator 3 comprises a binary counter 10 and a quarz 11 having an oscillation frequency of 32768 Hz, which is connected to the binary counter 10 through a set of two parallel connected resistors R1,R2, and one series connected resistor R3 which are intended to keep unchanged the characteristics of the oscillator 11 with respect to the time and the temperature. The binary counter 10 has three output 12,13,14 each emitting a square wave of different frequency, for example $32768/2Hz^7$, $32768/2Hz^8$ and $32768/2Hz^9$. By bridging terminals A,B,C of the binary counter outputs the desired clock frequency of the system can be selected as the output CLK.

The binary counter is supplied by a voltage Vc and is grounded at 15. Also connected to the binary counter through the lead 16 is a reset circuit 19 comprising a NAND gate 17 the two inputs of which are connected to each other through a resistor R4 and a diode D1 which are connected in parallel to each other and a capacitor C1 connected to ground. The output 18 of the NAND gate 17 is connected to the address generator 4.

ADDRESS GENERATOR 4 AND PROGRAMMING DEVICE 7

Figure 3:
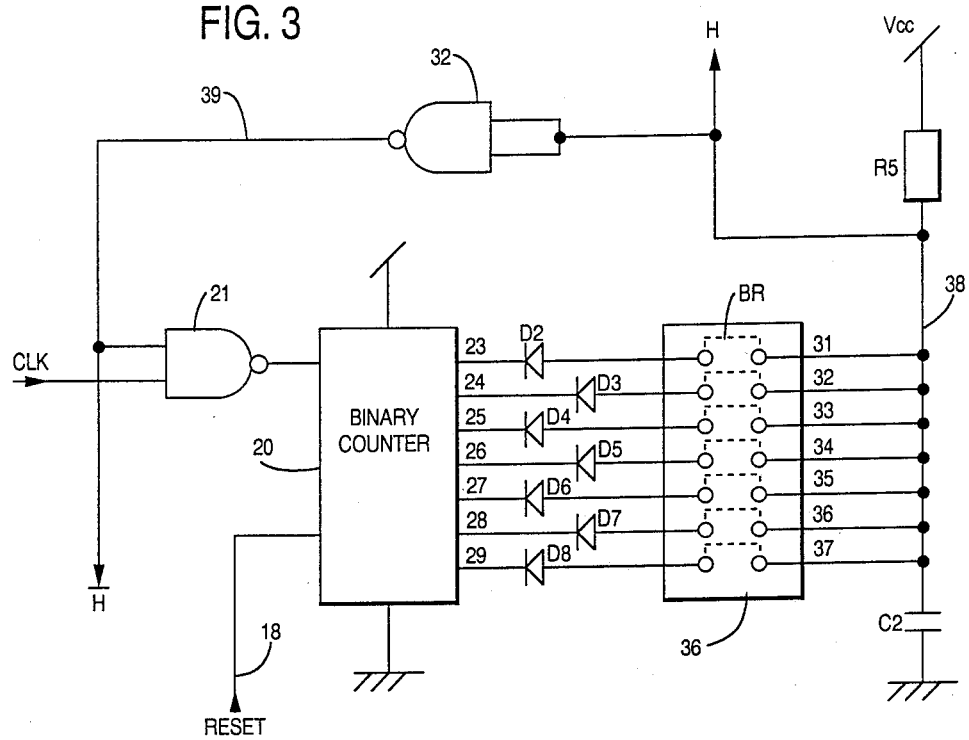
FIG. 3 shows the circuit diagram of the address generator and the programming device.

As can be seen in FIG. 3, the address generator 4 comprises a binary counter 20 having seven outputs 23 to 29. The outputs 23 to 29 of the binary counter 20 are connected through diodes D2 to D8 to the programming device 7.

The programming device 7 is formed by an interface 30 comprising seven bridges BR which connect the outputs 23 to 29 to the wires 31 to 37 which are connected to the output line 38 in order to provide in a binary code the device address. In effect, the wires 31 to 37 supply bits of weight 1 to 6. Line 38 is connected at one end to a capacitor C2 connected to ground. Lead 38 supplies the address signal H to the multiplexer unit and to the two inputs of a NAND gate 22, the output of which supplies the inverted address signal $\overline{H}$, on the lead 39, also to the multiplexer unit 2 and to one input of a NAND gate 21, to the other input of which the signal CL is applied and the output of which is connected as input to the binary counter 20.

MULTIPLEXER UNIT 2

The multiplexer unit 2 is comprised of four blocks, namely:
(1) Timing and selecting circuit
(2) Voltage level shifter
(3) Power supply enabling circuit
(4) Multiplexer.

Figure 4:
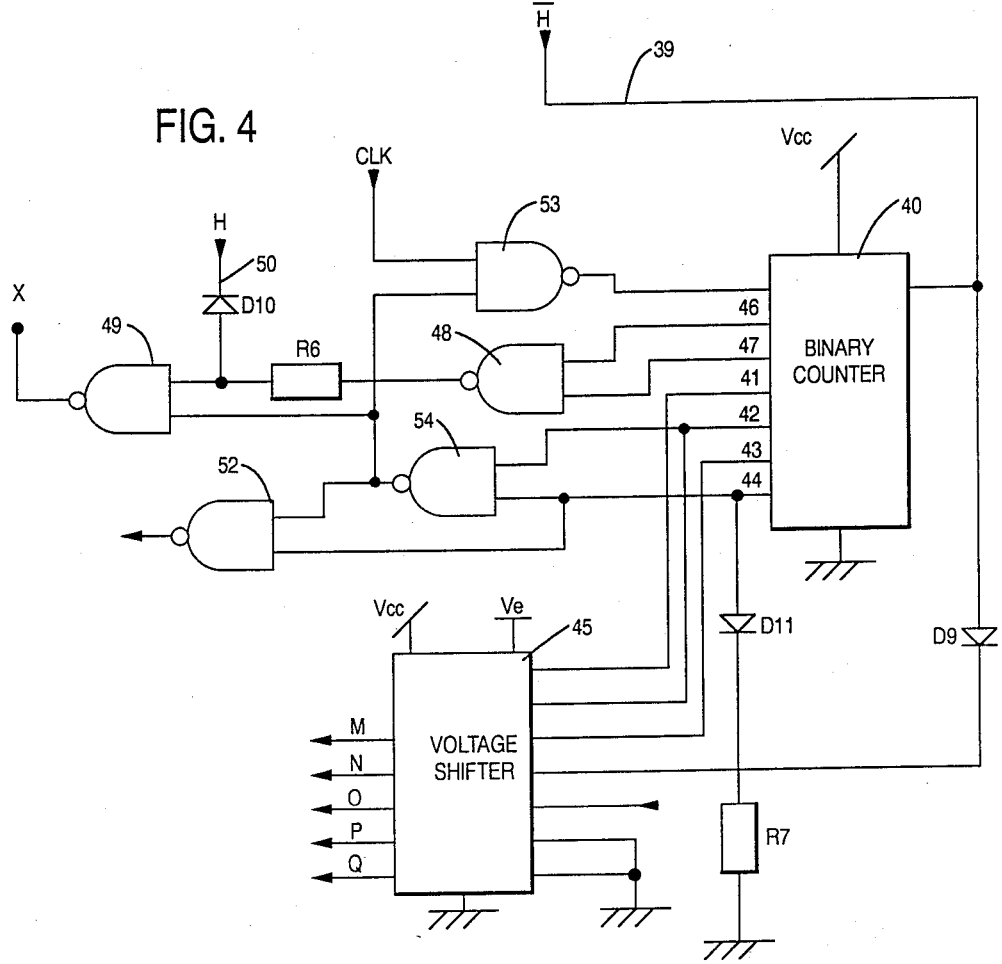
FIG. 4 shows the circuit diagram of the timing and selecting circuit and the enabling circuit of the multiplexer unit.

As can be seen in FIG. 4, the timing and selecting circuit comprises a binary counter 40 supplied by the voltage Vcc and having as an input the inverted signal $\overline{H}$ coming from the programming device 30 through lead 39. The outputs 41 to 44 of the binary counter 40 supply signals of binary count as inputs to a level adaptor 45 which supplies at its outputs the binary coded signals M,N,O,P,Q adapted for the multiplexer unit. Lead 39 of the inverted address signals $\overline{H}$ is also applied, through a diode D9, to an input of the level adaptor 45. Output 44 is also connected to a ground through a diode D11 and a resistor R7. From the binary counter 40 two outputs 46,47 are connected to the two inputs of a NAND gate 48 the output of which is connected, through a resistor R5, to one input of NAND gate 49, the output of which supplies a signal X to the power supply circuit. Intermediate the resistor R6 and the NAND gate 49 a diode D10 is connected through a lead 50 which supplies the address signal H. The outputs 42,44 of the binary counter 40 are also applied to the two inputs of a NAND gate 51 the output of which is connected to one input of another NAND gate 52, the other input of which is connected to the output 44 of the binary counter 40. The output of the NAND gate 52 supplies a signal which is applied as one input to the level adaptor 45. The output of the NAND gate 51 is also connected to one input of the NAND gate 49 and to one input of a further NAND gate 53 to the other input of which the clock signal CLK is applied and the output of which is connected to the binary counter 40.

Figure 5A:
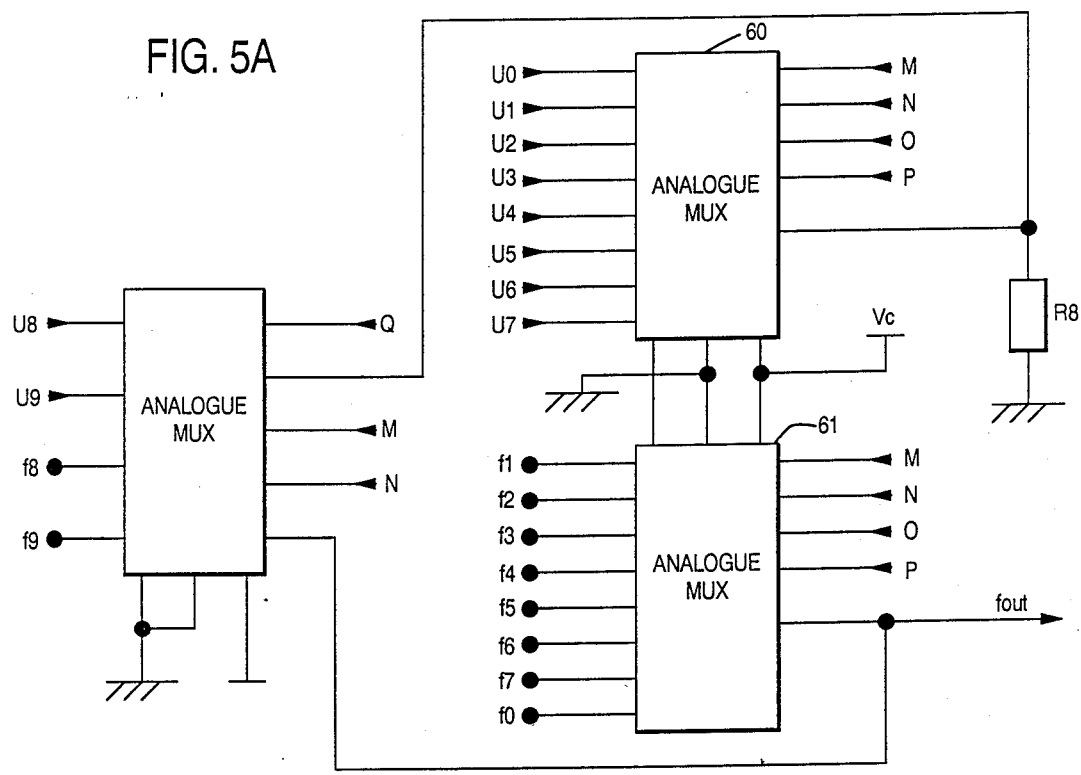
FIGS. 5A and 5B show the circuit diagram of the multiplexer unit.
Figure 5B:
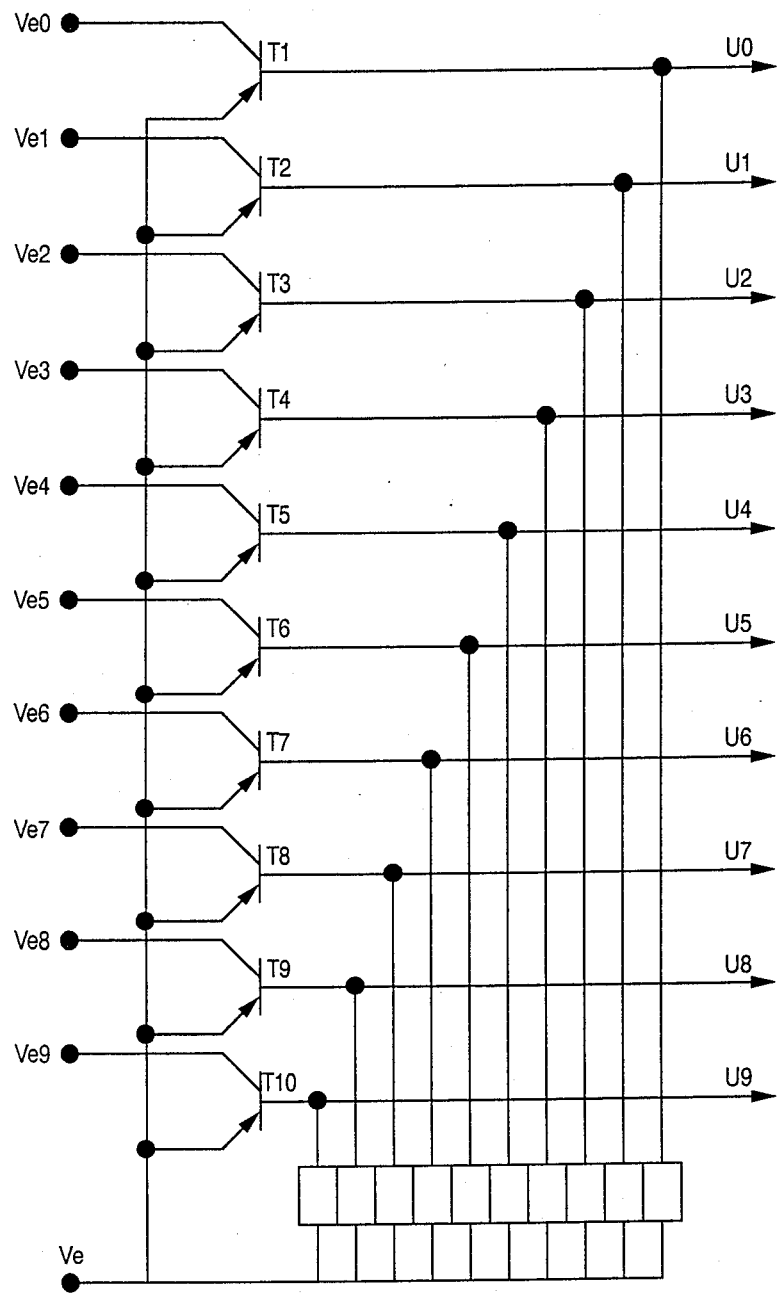

The multiplexer unit 2 is illustrated in FIG. 5A and 5B and comprises the analog multiplexers 60,61,62. The multiplexers 60,62 receive as inputs the signals U0 to U9 which control the bases of transistors T1 to T10 of the power supply enabling circuit. These multiplexers also receive as inputs the coded signals M,N,O,P,Q coming from the level adaptor 45. The multiplexer 61 supplies the signals f0 to f9 and is set to receive the frequency signal $f_{out}$ coming from the sensor selected by the multiplexer unit by means of the coded signals M,N,O,P, from the level adaptor.

POWER SUPPLY CIRCUIT 5

Figure 6:
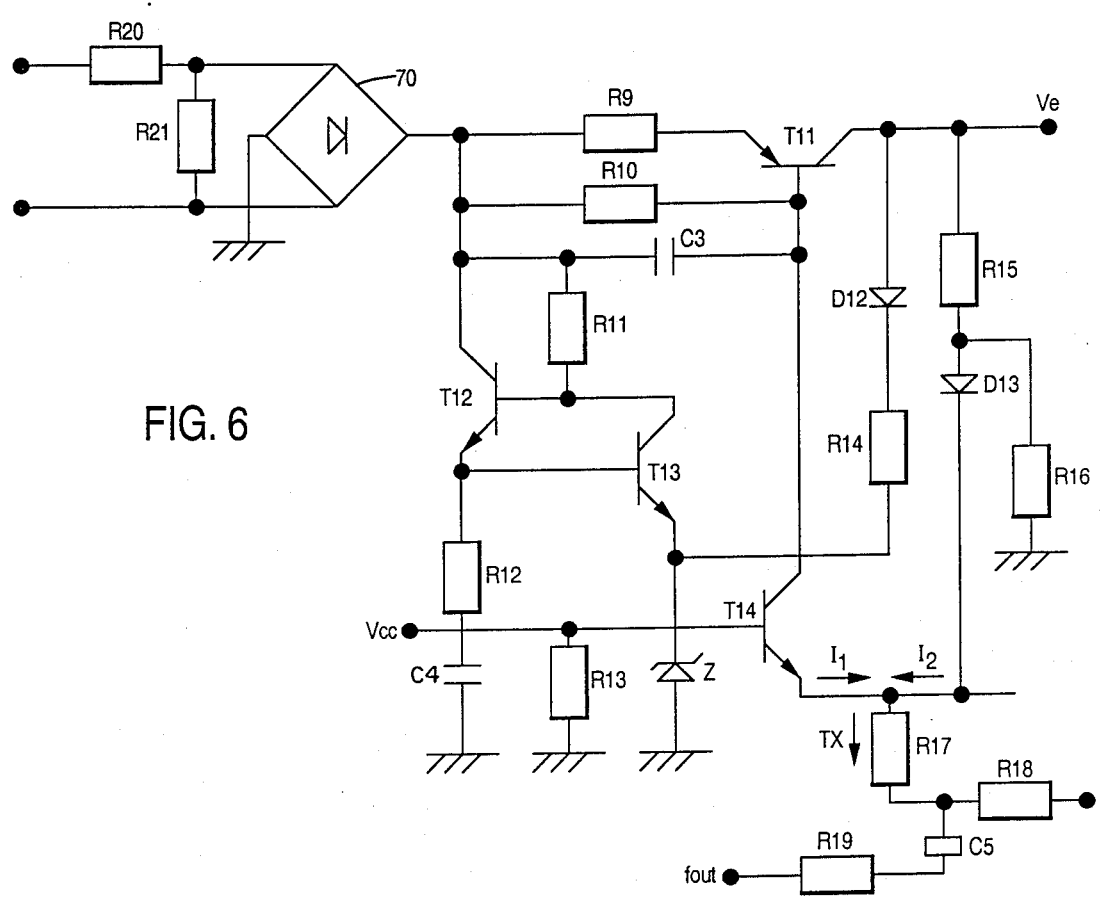
FIG. 6 shows the stabilized power supply circuit.

The power supply circuit 5 supplies the voltage Vcc (+5V) and Ve (+12V) to the system, and these voltages are obtained from the line voltage. As can be seen in FIG. 6, this circuit comprises two input lines provided with parallel connected resistor R20,R21 and connected to a diode bridge 70 series connected through a resistor R9 to the emitter of a transistor T11, the collector of which gives as output the voltage Ve. Upstream the resistor R9 the collector of a transistor T12 is connected, the emitter of which is connected to ground, through a resistor R12 and a capacitor C4, while the base of this transistor is connected to the collector of a transistor T13, the base of which is connected intermediate the emitter of transistor T12 and the resistor R12 and the emitter of which is connected to a diode Zener Z which is connected to ground and, through a resistor R14 and a diode D12, to the output carrying the voltage Ve. The base of transistor T12 is connected through a resistor R11 to a capacitor C3 parallel connected intermediate the base of transistor T11 and the collector of transistor T12, also between which a resistor R10 is parallel connected. The base of transistor T11 is connected to the collector of a transistor T14, the emitter of which is connected to the output Ve through a diode D13 and a resistor R15. Intermediate the diode D13 and the resistor R15 a resistor R16 is connected to ground. The emitter of transistor T14 is also connected through a resistor R17 and a resistor R18 to the terminal of signal X. Upstream the resistor R18 a capacitor C5 is connected which, through a resistor R19, is connected to the frequency terminal $f_{out}$. The base of transistor T14 supplies the voltage Vcc.

The voltage Vcc obtained through the diode Zener Z is suitably filtered by the capacitor C4. The limitation of current of the voltage Vcc is given by the current generator formed of the transistors T12,T13 and the resistor R12. This resistor is provided for deciding the current of the generator. The resistor R13 is provided for discharging the capacitor C4 when there is a lack of line voltage.

The voltage Ve is generated only when the system requires it, namely when the signal X is to 0 volt. With the signal X is to 0 Volt the transistor T14 becomes conducting, thereby biasing the base of transistor T11. The current Ix flowing in the branch R17-R18 is constant since the voltage drop across the resistors R17,R18 is constant. This voltage is given by the following relation:

$$Vz^2 - Vbe(T14)Ix = I_1 + I_2.$$

The voltage Ve is stabilized by the balance formed between the currents $I_1$ and $I_2$ since if a decrease of Ve would occur, there will be a resulting decrease of the current flowing in the branch R15-D13 and, since Ix is consant, this would cause a current increase at T14. This current increase would bias the transistor T11 more strongly with a resulting increase of the Ve value.

In the presence of the voltage Ve, a portion of the current necessary for the diode Zener Z is picked up by the base of transistor T14. The current lacking to the diode Zener Z is provided by the branch D12-R14. A second function of this power supply circuit is to transform the frequency signal supplied by the terminal $f_{out}$ in a current modulation. This transformation is always based upon the current picked up by the branch R17,R18. The capacitor C5 acts as a high pass filter.

OPERATION

The operation of the single/multiple transducer according to this invention is as follows.

When the power supply circuit 5 is supplied with an a.c. voltage, the power supply 5 provides the necessary operating d.c. voltages Ve, Vc and Vcc to the clock generator 3, the address generator 4 and the multiplexer unit 2, respectively.

Then the clock generator 3 starts to deliver to address generator 4 a chain of clock pulses CLK having a stable and precise frequency. By employing this frequency the address generator 4 makes a count which generates a different bit code for each pulse. The reset circuit 19 supplies a RESET signal to the binary counter 10, for its initialization through lead 16, i.e. to bring to a low logic level "0" the outputs 23 to 29 and to initialize the address generator 4. The RESET signal remains at the high logic level "1" until the voltage on the capacitor C1 overcomes the treshold level of the NAND gate 17. Diode D1 is provided for quickly discharging the capacitor C1 at the time where there would be a lack of voltage Vcc supplying the reset circuit, thereby permitting a new initialization of the binary counter 10.

When the generated code is the same as the code programmed by the operator of installer through the programming device 7 (obtained by connecting one or more of the bridges BR in this device), the address generator 4 generates on the output 38 the address signal H corresponding to the first sensor S0 which can be a sensor of a physical quantity or the condition of the contacts associated to pressure switches, humidistats, flow regulators, relays as well as electric variables such as voltage, resistance, current and so on. This address signal $\overline{H}$ is supplied to the timing and selecting circuit. The signal H suitably inverted through the NAND gate 22 is supplied to the multiplexer unit 2 in order to keep it to zero as long as all the output 23 to 29 connected to the capacitor C2 through the programming device 30 are in the logic state "1". Only with this precise configuration the capacitor C2 is kept charged (logic level "1") thereby bringing the signal $\overline{H}$ to a high level. The signal $\overline{H}$, suitably inverted by the NAND gate 22 starts the binary counter 40, the outputs 41 to 44 of which are applied to the level adaptor 45 which gives as output the coded signals M,N,O,P,Q for the multiplexers 61,62. The signal $\overline{H}$ at the same time disables the address generator 4 by locking the clock signal CLK to the binary counter 20 by means of the NAND gate 21.

This address is decoded by the multiplexer unit 2 which diverts to the selected one of the sensors S0 to S9 the operating voltage Ve from the power supply 5 and also diverts the frequency signal $f_{out}$ generated by the sensor through the power supply 5 and to the signal output line 6.

The start of the measurings is provided by the inverted address signal H coming from the address generator 4 through wire 39. The binary counter 40 remains with all the outputs 41-46 low as long as the inverted address signal H is high, thereby desabling all the cascade connected blocks. By bringing the H signal to the logic level 0 the binary counter 40 starts to count thereby giving again on its outputs 41 to 44 a binary count which through the voltage level circuit shifter 45 form the "words" M,N,O,P,Q necessary for the multiplexer unit to select the sensors S0 to S9. The voltage level shifter brings the voltage Vcc to the level of the voltage Vc necessary for enabling the multiplexer unit. (An example thereof is the Mc14504B made by Motorola). The supplied voltage Ve is generated exclusively when the signal X coming from the output of the NAND gate 49 is at a low level "0". The signal X is applied to the power supply circuit 5 for controlling it. This enabling circuit is therefore intended to establish when the signal X is to be brought to 0 through the NAND gates 48,51 and 49.

During the selection, the logic levels of these NAND gates bring the signal X to a low logic level for ¾ of the selection time of the sensor. The high logic level of signal X is permitted, before the selection, by the address signal H entering through wire 50 and, after the selection, by the signal coming from the output of the NAND gate 51. Another function of this enabling circuit is to distribute the supply voltages Ve0 to Ve9 to the various sensors. This function is carried out by a set of transistors T1 to T10 (FIG. 5B) controlled through their bases by the multiplexers 60,62. The bases of these transistors supply to the multiplexers 60,62 the signals U0 to U9. By connecting the base of the pre-selected transistor to the resistor R8 the voltage Ve is present on the collector of the same transistor.

After a short predetermined time is elapsed, the address generator 4 interrupts the signal output and then the address generator 4 generates the coded address corresponding to the following sensor.

This procedure will be repeated as many times as the sensors connected to the multiplexer unit 2 are.

By means of this system each of the sensors can be connected through the transducer to a single pair of wires without interfering with each other during the transmission of the measurement to the acquisition unit, thereby permitting an important installation saving and a quicker operation of the system to be obtained. These devices operate with very low currents and are remotely supplied by the same pair of wires 6 on which they send the response signal and therefore do not need to be locally power supplied.

The acquisition unit directly provides the necessary voltage for the regular operation of the transducer.

By means of this single/multiple transducer one or more transducers measuring different variables can be connected one a single line. For example, one a single pair of wires temperature sensors, pressure sensors, current sensors, moisture sensors and all the sensors providing on their outputs a voltage, a current or a resistance can be connected.

The advantages provided by the single/multiple transducer according to this invention with respect to the single pressure transducers are the following:
 (1) Cost reductions for each measurement because the costs of the common components are divided by the number of used measurement locations.
 (2) Substantial cost savings in the single/multiple transducer installation because it is sufficient to make a single electric connection to the location in which it is desired to detect the physical quantity.

(3) Operating cost reduction of the single/multiple transducers because a single loop is used.

What is claimed is:

1. A transducer for measuring one or more conventional physical quantities and electric variables, comprising:

at least one sensor, each of said at least one sensor detecting either a physical quantity or an electric variable, and outputting a frequency signal having a frequency which is proportional to a level of either said detected physical quantity or said detected electric variable;

a multiplexer unit for selecting and enabling said at least one sensor according to a coded address assigned to each of said at least one sensor, and for transmitting each said frequency signal received from each of said at least one sensor;

an address generator for forming and delivering to said multiplexer unit each said coded address assigned to each of said at least one sensor;

a clock generator connected to said multiplexer unit through said address generator, for controlling a rate of operation of said multiplexer unit and said address generator;

a power supply unit for delivering an operating voltage to said multiplexer unit, said clock generator, and said address generator; and, a single loop for supplying electric power to said power supply unit and for delivering each said frequency signal transmitted from said multiplexer unit.

2. A transducer as claimed in claim 1, wherein said address generator comprises a programming device for generating each said coded address.

3. A transducer as claimed in claim 1, wherein said multiplexer unit includes a voltage level shifter for enabling said multiplexer unit and a power supply enabling circuit for enabling said power supply unit when measuring is required.

4. A transducer as claimed in claim 1, wherein said address generator comprises a binary counter.

5. A transducer as claimed in claim 1, wherein each of said at least one sensor comprises a voltage-to-frequency converter for outputting a frequency signal which is proportional to a voltage applied to an input of said voltage-to-frequency converter.

6. A transducer as claimed in claim 2, wherein said address generator comprises a binary counter, and wherein said programming device comprises bridges connecting outputs of said binary counter to said multiplexer unit.

7. A transducer as claimed in claim 1, wherein said power supply unit is a stabilized power supply.

8. A transducer as claimed in claim 1, wherein said multiplexer unit is comprised of a plurality of analog multiplexers.

* * * * *